United States Patent [19]
Gautier et al.

[11] Patent Number: 5,746,107
[45] Date of Patent: May 5, 1998

[54] PNEUMATIC BOOSTER WITH REDUCED LOAD AND REDUCED HYSTERESIS

[75] Inventors: Jean Pierre Gautier; Ulysse Verbo, both of Aulnay-sous-Bois, France

[73] Assignee: Bosch Systems De Freinage, Drancy, France

[21] Appl. No.: 525,573

[22] PCT Filed: Aug. 17, 1995

[86] PCT No.: PCT/FR95/01089

§ 371 Date: Sep. 19, 1995

§ 102(e) Date: Sep. 19, 1995

[87] PCT Pub. No.: WO96/07573

PCT Pub. Date: Mar. 14, 1996

[30] Foreign Application Priority Data

Sep. 8, 1994 [FR] France ................... 94 10727

[51] Int. Cl.$^6$ ................... F15B 9/10
[52] U.S. Cl. ................... 91/376 R
[58] Field of Search ................... 91/376 R

[56] References Cited

U.S. PATENT DOCUMENTS

| | | | |
|---|---|---|---|
| 5,263,398 | 11/1993 | Kobayashi et al. | 91/376 R |
| 5,546,846 | 8/1996 | Bauer | 91/376 R |
| 5,579,675 | 12/1996 | Gautier et al. | 91/376 R |

FOREIGN PATENT DOCUMENTS

| | | |
|---|---|---|
| 4120118 | 12/1992 | Germany. |
| 94/29153 | 12/1994 | WIPO. |

*Primary Examiner*—Sheldon Richter
*Attorney, Agent, or Firm*—Leo H. McCormick, Jr.

[57] ABSTRACT

A pneumatic-controlled device for a vacuum brake booster having a hollow piston which retains a tubular shut-off member. The tubular shut-off member interacts with a stationary seat and a movable seat to define a chamber within the hollow piston when the movable seat is in an actuation position. An orifice formed in the tubular shut-off member places the chamber in communication with a passage defined between the stationary and movable seats to reduce hysteresis experienced by movement of the movable seat.

4 Claims, 4 Drawing Sheets

PNEUMATIC BOOSTER WITH REDUCED LOAD AND REDUCED HYSTERESIS

The present invention relates, in general, to pneumatic brake boosters.

More precisely, the invention relates to a pneumatic brake booster of the type of those which comprise: a rigid casing in which a movable partition delimits a front chamber and a rear chamber; a hollow piston into which there emerge a first inlet connected to a first source of pressure delivering a relatively high pressure, a second inlet connected to the front chamber of the booster and to a second source of pressure delivering a relatively low pressure and an outlet connected to the rear chamber whose pressure is to be controlled, this piston being capable of being entrained by the movable wall; and a valve incorporated into the piston in order to establish selectively a communication between either one of the inlets and the outlet, this valve itself comprising: a first annular seat formed by an internal crown of the piston on the outside of which the second inlet emerges; a second annular seat, closed off axially, mounted in the first seat with clearance defining a passage connected to the outlet, and sliding axially inside this first seat between a position of rest, in which it is further from the front chamber than the first annular seat, and an actuating position, in which it is at least as close to the front chamber as the first annular seat; and a shut-off member of tubular shape exhibiting, on the one hand, a posterior part mounted in leaktight fashion in the piston some distance from the first seat, and the inside of which is connected to the first source and, on the other hand, an annular active face which can move along an axis of the piston, urged by an elastic force in a first axial direction pointing towards the front chamber and able to interact with the second seat in the position of rest of the latter in order to connect the outlet to the second source through the passage, and with the first seat in the position of actuation of the second seat in order to connect the outlet to the first source through this passage, while preventing communication between the two inlets in all cases, the annular active face of the shut-off member being coupled to the posterior part by its internal diameter and pierced with at least one orifice communicating with the passage formed between the two seats, and the internal perimeter of the piston and the edge of the active face of the shut-off member both being shaped in order to exert on one another a contact pressure which is sufficient to guarantee that one of them shuts off the other in leaktight fashion for at least one position of the second seat.

A booster of this type is described in the international patent document published under the number WO 94/04403, and invented in parallel and independently by the Applicant.

A problem conventionally encountered with known boosters, and even also with the booster described in this document, lies in the fact that the forces to be overcome to actuate the booster are not applied with the same intensity or in the same direction when the booster returns to its position of rest, which causes undesirable hysteresis to arise in the operation of these boosters.

The invention falls within this context and aims to reduce this undesirable hysteresis. To this end, the booster of the invention which, moreover, conforms to the generic definition thereof given in the preamble above, is essentially characterized in that the internal perimeter of the piston and the edge of the active face of the shut-off member are shaped in order to exert on one another when the second seat is some distance from its actuating position, a contact pressure which is less than the one which they exert when the second seat is in its actuating position.

According to a first possible embodiment of the invention, the edge of the active face of the shut-off member bears a sealing lip, and the internal perimeter of the piston, in a plane close to the first seat and perpendicular to the first axial direction, widens out as this plane gets further away from this seat and from the front chamber.

According to a second possible embodiment of the invention, the internal perimeter of the piston bears a third seat substantially coplanar to the first, the second inlet opening out between the first and third seats, and the edge of the active face of the shut-off member being, in a plane perpendicular to the first axial direction, distant from the internal perimeter of the piston, over at least most of its perimeter.

In the latter case, the active face of the shut-off member is preferably reinforced by a rigid insert which extends over a central part of its surface as far as beyond a peripheral region in which this active face exhibits an increase in thickness which is intended to come into contact with the third seat.

Other features and advantages of the invention will emerge clearly from the description thereof which is given hereafter by way of non-limiting indication with reference to the appended drawings, in which.

Figure 1:
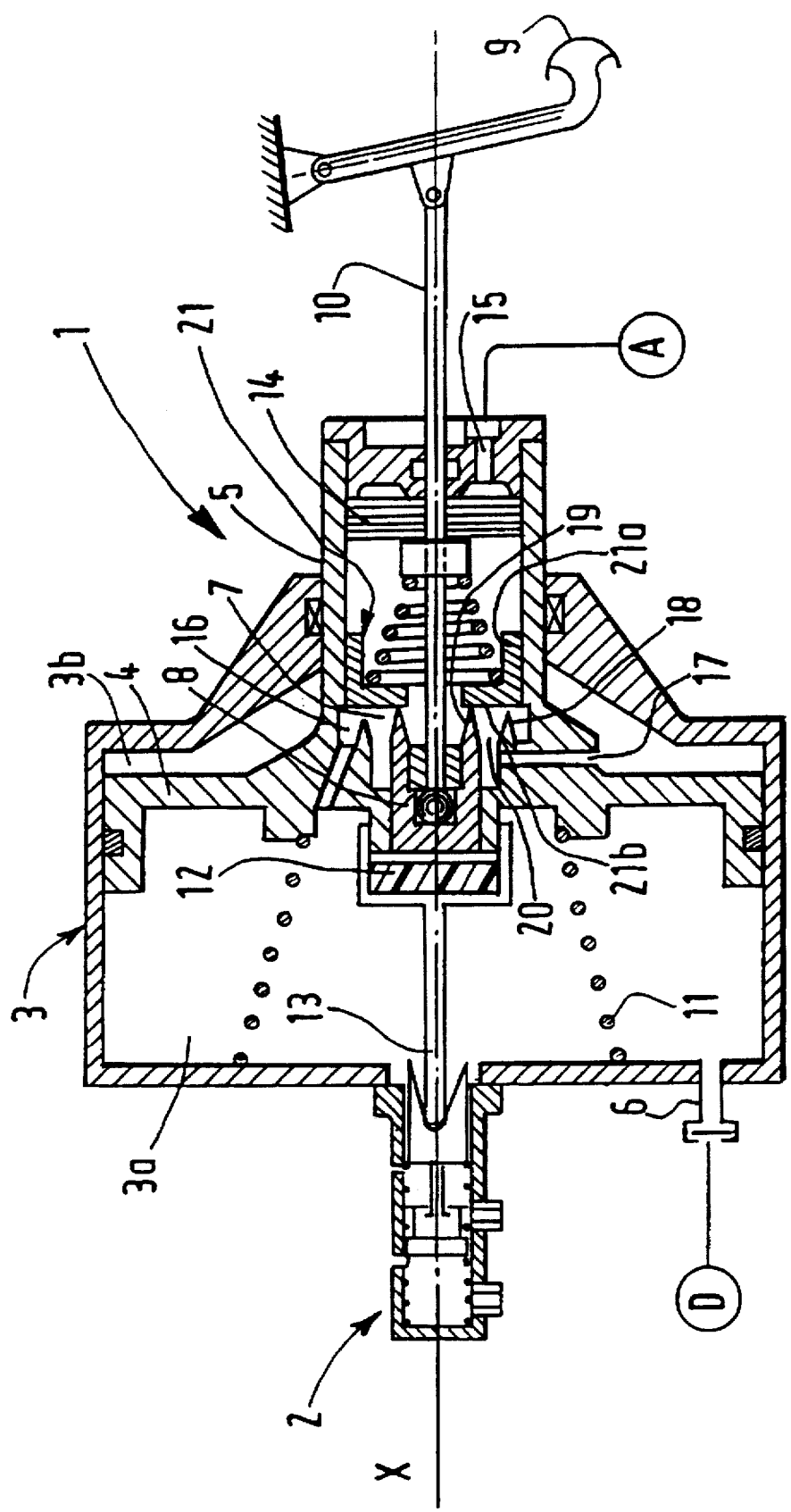
FIG. 1 is a diagrammatic view in section of a pneumatically boosted braking system using a conventional booster, the shut-off member being represented in its position of rest.

In so far as the invention relates merely to an improvement made to pneumatically-boosted braking systems, and as the general make-up and operation of the latter are well known to the person skilled in the art, these systems will merely be recalled quickly here in order to allow a total understanding of the improvement that the invention represents.

Schematically, a system of this type comprises a booster 1 and a master cylinder 2.

The booster itself comprises a rigid casing 3 divided into two chambers 3a and 3b in a leaktight fashion by a movable partition 4 capable of entraining a pneumatic piston 5 which can move inside the casing 3.

The front chamber 3a, the front face of which is closed in leaktight fashion by the master cylinder 2, is permanently coupled up to a source D of low pressure through a non-return valve 6.

The rear chamber 3b is, in contrast, capable of being coupled up selectively either to the source D of low pressure, or to a source of high pressure, for example to atmosphere A.

To this end, access to the rear chamber 3b is controlled by a valve 7 and a plunger 8, the latter being connected to a brake pedal 9 via a control rod 10.

When the control rod 10 is in the position of rest, in this case pulled to the right, the valve 7 normally establishes a communication between the two chambers 3a and 3b of the booster.

As the rear chamber 3b is then subjected to the same partial vacuum as the front chamber 3a, the piston 5 is pushed back towards the right, into the position of rest, by a return spring 11.

Actuation of the plunger 8 through a movement of the control rod 10 to the left has the effect, firstly, of displacing the valve 7 so that it isolates the chambers 3a and 3b from one another then, secondly, of displacing this valve so that it opens the rear chamber 3b to atmospheric pressure A, through a filter 14.

The difference in pressure between the two chambers, then felt by the movable partition 4, exerts a thrust on the latter which tends to displace it to the left, and allow it to entrain the piston 5, which is displaced in turn, compressing the spring 11.

The braking force exerted on the plunger 8 by the control rod 10, or "input force", and the brake boosting force, or "boost force", resulting from the thrust of the movable partition 4, combine on a reaction disc 12 in order to constitute an actuating force which is transmitted to the master cylinder via a push rod 13.

The assembly composed of the valve 7 and of the members which interact with it constitutes the device for pneumatic control of the booster.

More precisely, such a device conventionally comprises: three paths 15, 16 and 17; the pneumatic piston 5 itself; first and second annular seats 18, 19; and a shut-off member 21, of tubular shape.

The three paths themselves comprise a first inlet 15 connected to a first source delivering a relatively high pressure, in this case atmospheric pressure A, a second inlet 16 connected to the front chamber 3a of the booster and to a second source delivering a relatively low pressure, in this case the vacuum D, and an outlet 17 connected to the rear chamber 3b of the booster, and allowing the pressure in this chamber to be controlled.

Each of these paths emerges in the hollow pneumatic piston 5 to allow selective communication to be set up between either one of the inlets 15 and 16, and the outlet 17.

The first annular seat 18 is formed by an internal crown of the piston, on the outside of which the second inlet 16 emerges, while the second annular seat 19 is formed by the periphery of the plunger 8, and is therefore axially shut off by the end of this plunger.

Figure 2:
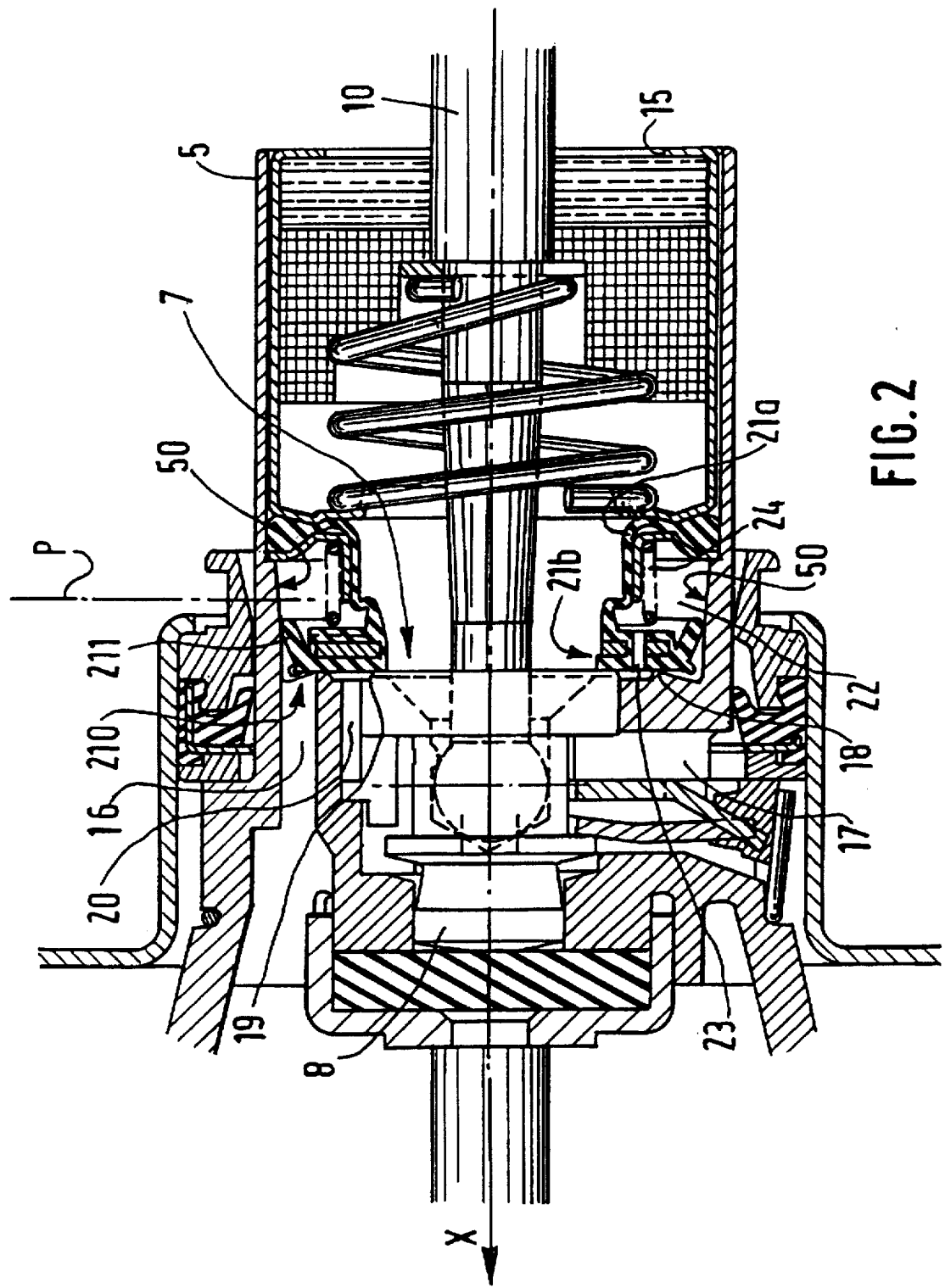
FIG. 2 is a view in partial section of a booster in accordance with a first embodiment of the invention, the shut-off member being represented in its actuating position.
Figure 3:
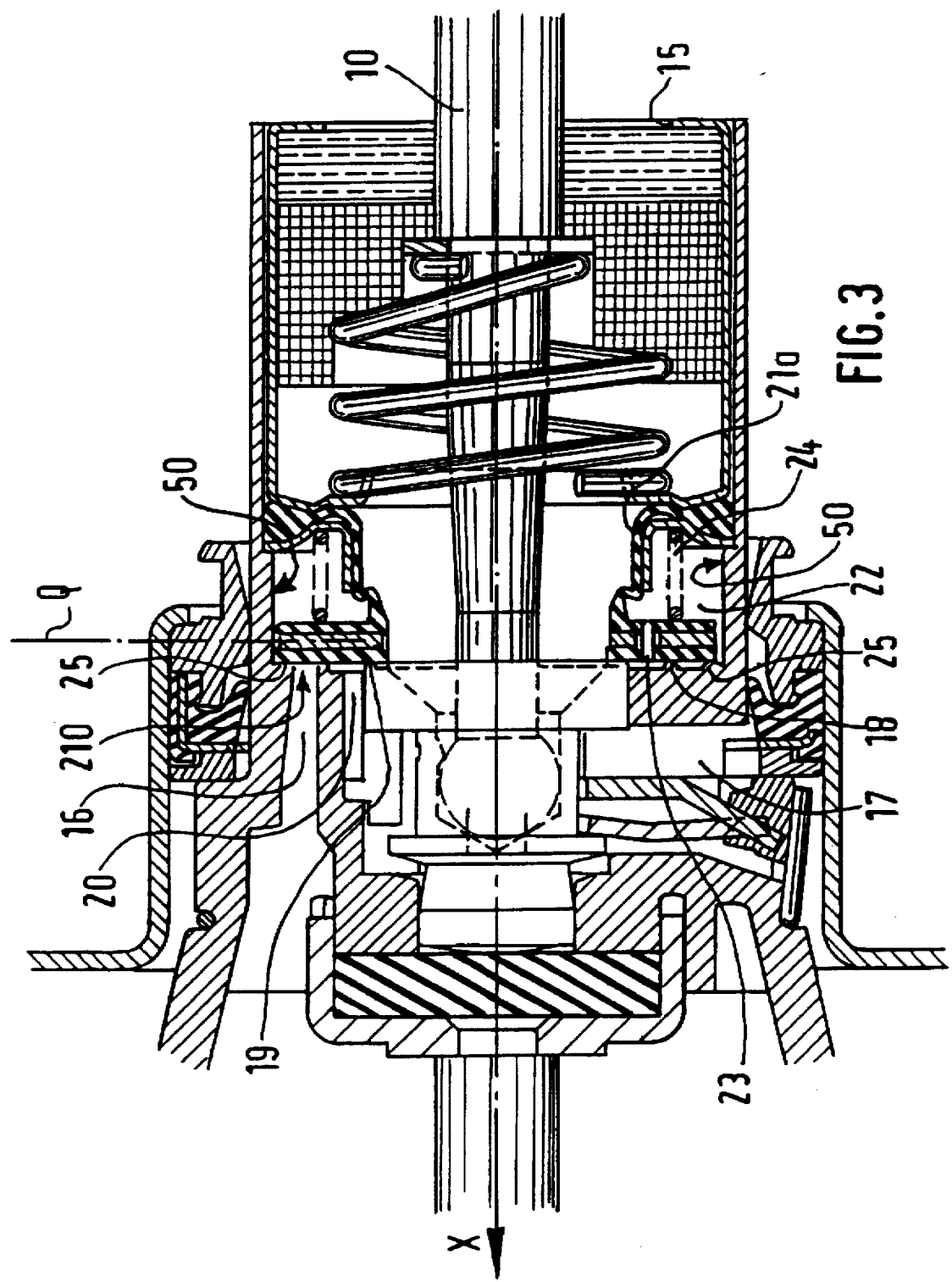
FIG. 3 is a view in partial section of a booster in accordance with a second embodiment of the invention, the shut-off member being represented in its actuating position.

By virtue of the sliding of the plunger 8, the second seat 19 can be displaced between a position of rest, in which it is further from the front chamber 3a than the first annular seat 18, and which is the one illustrated by FIGS. 1 and 2, and an actuating position, in which it is at least as close thereto as the first seat 18, and which is the one illustrated by FIG. 3.

As FIG. 1 shows, the second seat 19 is located inside the first seat 18, with a clearance which allows a passage 20 connected to the outlet 17 to be defined.

The shut-off member 21, of tubular shape, exhibits, on the one hand, a posterior part 21a mounted in leaktight fashion inside the piston 5 some distance from the first seat 18, and the inside of which is connected to the first source A and, on the other hand, an annular active face 21b which can move along an axis of the piston and is urged by an elastic force in a first axial direction X pointing towards the front chamber 3a.

The annular active face 21b interacts with the second seat 19 in the position of rest of the latter (FIGS. 1 and 2) in order to connect the outlet 17 to the second source D through the passage 20, and interacts with the first seat 18 in the actuating position of the second seat 19 (FIG. 3) in order to connect the outlet 17 to the first source A through this same passage 20, any communication between the two inlets 15 and 16 being prevented, regardless of the position of the plunger 8.

More precisely (FIGS. 2 to 4), the invention relates to a booster in which the annular active face 21b of the shut-off member is coupled up to the posterior part 21a via its internal diameter and is pierced with at least one orifice 23 communicating with the passage 20 formed between the two seats 18, 19.

Moreover, the internal perimeter 50 of the piston 5 and the edge 210 of the active face of the shut-off member 21 are both shaped in order to exert on one another a contact pressure which is sufficient to guarantee, under at least some conditions, that one shuts off the other in leaktight fashion, the internal perimeter 50 of the piston, the reverse side of the active face 21b and the outside of the posterior part 21a of the shut-off member 21 therefore together defining a chamber 22 which is open towards the outside only through the orifice 23.

By virtue of this arrangement, the spring 24 intended to push the shut-off member 21 in the axial direction X effectively need only apply a relatively low force by comparison with that which it is necessary to provide in a more conventional booster such as the one represented in FIG. 1.

Figure 4:
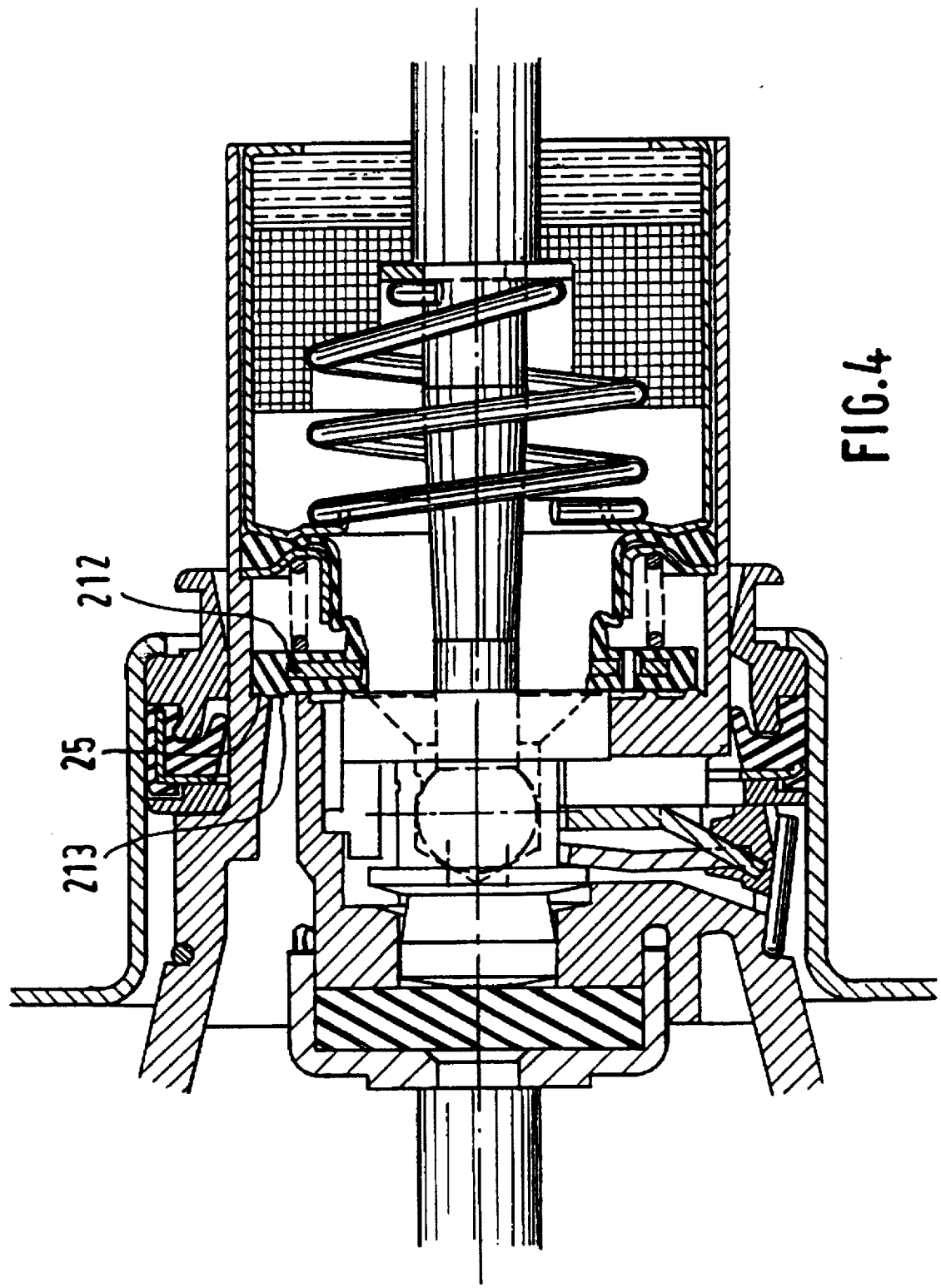
FIG. 4 is a view in partial section representing an embodiment variant of the booster of FIG. 3.

The invention makes it possible to perfect this arrangement further by making provision for the internal perimeter 50 of the piston and the edge 210 of the active face 21b to be shaped in order to exert on one another, when the second seat 19 is some distance from its actuating position, a contact pressure which is less than the one which they exert when this second seat 19 is in its actuating position, the latter position being the one which is represented by FIGS. 2 to 4.

This operating characteristic is obtained, in the case where the edge 210 of the active face of the shut-off member bears a sealing lip 211 (FIG. 2), by making provision for the internal perimeter 50 of the piston, observed in a plane of trace P close to the first seat 18 and perpendicular to the first axial direction X, widens as this plane moves away from this seat and from the front chamber.

For example, as FIG. 2 shows, the internal perimeter 50 may adopt a frustoconical shape which flares out towards the rear of the booster.

Under these conditions, the rubbing of the lip 211 on the inside 50 of the piston, which is just necessary to guarantee sealing of the chamber 22, in practice arises only for the actuating position represented in FIG. 2, so that the return of the booster to its position of rest at the end of actuation causes no significant parasitic frictional force to arise despite the presence of the lip 211, the natural shaping of which considerably favours sliding forwards by comparison with sliding backwards.

The desired operating characteristic may also be obtained, as the second embodiment of the invention represented in FIG. 3 shows, by making provision for the internal perimeter 50 of the piston to bear a third seat 25 substantially coplanar with the first seat 18, the second inlet 16 opening out between the first and third seats 18, 25, and the edge 210 of the active face of the shut-off member being, in a plane of trace Q perpendicular to the first axial direction X, distant, over at least most of its perimeter, from the internal perimeter 50 of the piston 5.

Under these conditions, the rubbing of the edge 210 of the active face of the shut-off member on the inside 50 of the piston is not only very slight but also totally unchanged between the actuating phase of the booster and the phase of return to its position of rest.

A preferred variant of this second embodiment is represented in FIG. 4.

According to this variant, the active face 21b of the shut-off member 21 is reinforced by a rigid insert 212 which extends over a central part of its surface as far as beyond a peripheral region in which this active face exhibits an increase in thickness 213 which is intended to come into contact with the third seat 25.

This arrangement makes it possible to get away more easily from the dimensional manufacturing tolerances, the increase in thickness 213 coming into contact prematurely with the third seat 25 during actuation of the booster, and the edge 210, not stiffened by the insert 212, then deforming in order to allow the active face 21b to be applied to the first seat 18.

We claim:

1. A pneumatic brake booster comprising: a rigid casing having a movable partition which delimits a front chamber from a rear chamber, a hollow piston connected to said movable wall and having a first inlet connected to a first source of pressure with a relatively high pressure, a second inlet connected to said front chamber and a second source of pressure having a relatively low pressure and an outlet connected to said rear chamber wherein the pressure in said rear chamber is to be controlled, and a valve located in said hollow piston for selectively communicating between one of said first and second inlets and said outlet, said valve having a first annular seat formed by an internal crown within said hollow piston adjacent said second inlet, a second annular seat concentric to said first annular seat with a clearance to define a passage connected to said outlet, said second annular seat axially sliding with respect to said first seat from a position of rest wherein said second annular seat is further from said front chamber than said first annular seat to an actuating position wherein said second annular seat is at least as close to said front chamber as said first annular seat, and a shut-off member having a tubular shape with a posterior part mounted in a seal relationship within said hollow piston at a distance away from said first annular seat and the inside of said tubular shape being connected to said first source of pressure, said tubular shape having an annular active face which moves along an axis of said hollow piston by an elastic force in a first axial direction toward said front chamber to interact with said second annular seat and connect said outlet to said second source of pressure through said passage, said annular active face interacting with said first seat in a position of actuation of said second seat to connect said outlet with said first source of pressure while preventing communication between the first and second inlets, said annular active face being coupled to said posterior part by an internal diameter having at least one orifice communicating with said passage formed between said first and second annular seats, said hollow piston having an internal perimeter with a shape adapted to engage an edge of said annular active face to guarantee that a leaktight seal develops in at least one position of said second annular seat, characterized in that said internal perimeter of said hollow piston and said edge of said annular active face are shaped to engage each other with a first contact pressure when said second annular face is some distance for an actuation position, and with a second contact pressure when said second annular seat is in said actuation position, said first contact pressure being less that said second contact pressure.

2. The brake booster according to claim 1, characterized in that said edge of said annular active face of said shut-off member includes a sealing lip and said internal perimeter of said hollow piston in a plane adjacent said first annular seat and perpendicular to a first axial direction widens out as said plane extend further away from said first annular seat and said front chamber.

3. The brake booster according to claim 1, characterized in that said internal perimeter of said hollow piston includes a third seat substantially coplanar to said first annular seat with said second inlet being located between said first annular seat and said third seat, and said edge of said annular active face of said shut-off member being located in a plane perpendicular to a first axial direction at a distance from said internal perimeter of said hollow piston, over at least most of said internal perimeter.

4. The brake booster according to claim 3, characterized in that said annular active face of said shut-off member is reinforce by a rigid insert which extends over a central part of said active face as far as beyond a peripheral region in which said active face exhibits an increased in thickness which is intended to come into contact with said third seat.

* * * * *